United States Patent
Röbke et al.

(10) Patent No.: US 8,649,809 B2
(45) Date of Patent: Feb. 11, 2014

(54) METHOD FOR EXCHANGING MESSAGES IN A MOBILE RADIO NETWORK

(75) Inventors: Matthias Röbke, Cologne (DE); Roland Hechwartner, Vienna (AU)

(73) Assignee: T-Mobile International AG, Bonn (DE)

( * ) Notice: Subject to any disclaimer, the term of this patent is extended or adjusted under 35 U.S.C. 154(b) by 1152 days.

(21) Appl. No.: 12/311,766

(22) PCT Filed: Sep. 26, 2007

(86) PCT No.: PCT/EP2007/008377
§ 371 (c)(1),
(2), (4) Date: Oct. 15, 2009

(87) PCT Pub. No.: WO2008/046495
PCT Pub. Date: Apr. 24, 2008

(65) Prior Publication Data
US 2010/0041420 A1    Feb. 18, 2010

(30) Foreign Application Priority Data
Oct. 13, 2006   (DE) .......................... 10 2006 049 034

(51) Int. Cl.
*H04W 4/00* (2009.01)
*H04M 1/725* (2006.01)

(52) U.S. Cl.
USPC ....................................... 455/466; 455/412.1

(58) Field of Classification Search
USPC .............. 455/466, 412.1–412.2, 414.1–414.3
See application file for complete search history.

(56) References Cited

U.S. PATENT DOCUMENTS

| | | | |
|---|---|---|---|
| 5,875,302 A | 2/1999 | Obhan | |
| 6,066,903 A | 5/2000 | Ichiyama | |
| 2002/0175577 A1 | 11/2002 | Yoshitsugu | |
| 2004/0108780 A1 | 6/2004 | Hoffmann | |
| 2004/0137884 A1* | 7/2004 | Engstrom et al. | 455/414.1 |
| 2005/0244086 A1 | 11/2005 | Murata | |
| 2005/0254481 A1 | 11/2005 | Vishik | |
| 2005/0285349 A1 | 12/2005 | Hori | |
| 2006/0051002 A1 | 3/2006 | Sekii | |
| 2006/0059689 A1 | 3/2006 | Kagata | |
| 2006/0277262 A1* | 12/2006 | Boss et al. | 709/206 |

FOREIGN PATENT DOCUMENTS

| | | |
|---|---|---|
| DE | 200218821 | 12/2002 |
| EP | 1365164 | 11/2003 |

* cited by examiner

*Primary Examiner* — Brandon Miller
(74) *Attorney, Agent, or Firm* — Cooper & Dunham LLP

(57) ABSTRACT

The invention relates to a method for exchanging messages in a mobile radio system by means of a convergent messaging system, which allows an exchange of messages between the terminals of two or more users. According to the invention, a message thread is detected by one of the terminals as soon as a terminal receives a response to a previously sent message, wherein the detection of a message thread by this terminal triggers a recording of the message exchange in the convergent messaging system.

13 Claims, 2 Drawing Sheets

METHOD FOR EXCHANGING MESSAGES IN A MOBILE RADIO NETWORK

Figure 1:
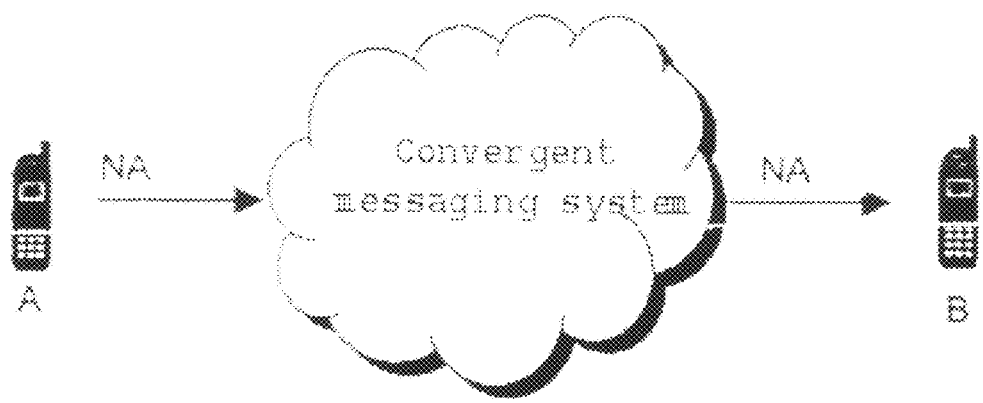

The invention relates to a method for message interchange in a mobile radio system according to the preamble of claim 1.

On the basis of the prior art, it is today possible to interchange messages with other users on the Internet. This is often done using "instant messaging" services, which store the interchanged messages. These "message threads" can be viewed by the users involved in the communication. A thread is literally a filament, yarn or strand. In the figurative sense, a thread is understood to mean a train of thought, including the thread of a discussion, or a series of contributions to a discussion in an (Internet) forum. In this case, the data management for the message contributions is performed in the communication network used, so that every user can view the flow of messages from any desired terminal (PC . . . ).

In the field of mobile radio, not only "instant messaging" services but also other "store and forward" services are known. These services include SMS (Short Messaging Service), MMS (Multimedia Messaging Service), EMS (Enhanced Messaging Service), etc.

In today's mobile radio landscape, these services are in the form of singular technical solutions (what are known as silos), i.e. each service exists independently of every other service, with individual functionalities of the services described already overlapping today; by way of example, it is thus possible to use either an MMS service or an SMS service to send text messages.

The silo approach described is intended to be replaced by what is known as a convergent messaging system, also called a unified messaging system, in the foreseeable future. A convergent messaging system of this kind will unify the individual functionalities of the messaging infrastructures which exist today and allow message interchange on a superordinate messaging architecture.

On the basis of the prior art today, it is not possible to manage message threads, even in the convergent messaging system. The problem is that of recognizing at the start of a conversation (message interchange) whether the users' communication is developing into a message thread or whether the message interchange is just a one-off event.

The object of the invention is to specify a method for message interchange in a mobile radio system which supports the use of message threads as part of a convergent messaging system. In particular, the aim is to allow singular interchange of messages to be distinguished from message threads.

The invention achieves this object by means of a method having the features of claim 1.

Preferred embodiments and further advantageous features of the invention are specified in the dependent claims.

A user of a convergent messaging service is rendered able to use the invention as easily as possible. Advantageously, the user does not need to decide from the outset (before the message is created or sent) whether a "message thread" is to be started or a single message is to be sent. When a response to a previously sent message arrives, the history i.e. the original message and response, needs to be displayed to the user.

The basic idea of the invention involves a message thread being recognized as such by a terminal as soon as a message previously sent by the terminal receives a response. In line with the invention, this is detected by the terminal or by the messaging client which is installed on the terminal.

The advantage of the invention can be seen in that distinguishing the two events described, namely singular message interchange as opposed to a message thread, means that it is not necessary for the history of singular message communication to be stored by a convergent messaging system (in the network). Nevertheless, the relevant history is displayed to the user from the first response to a message he has sent onwards. The time or the conditions from which or under which the message thread is stored on the network may be selectable by the user, preferably using parameters. By way of example, the parameters may relate to the order of the messages (e.g. from the first response onward . . . ).

An exemplary embodiment of the invention will now be described with reference to the drawings, in which:

FIG. 1 schematically shows the transmission of a single message between two terminals using a convergent messaging system.

Figure 2:
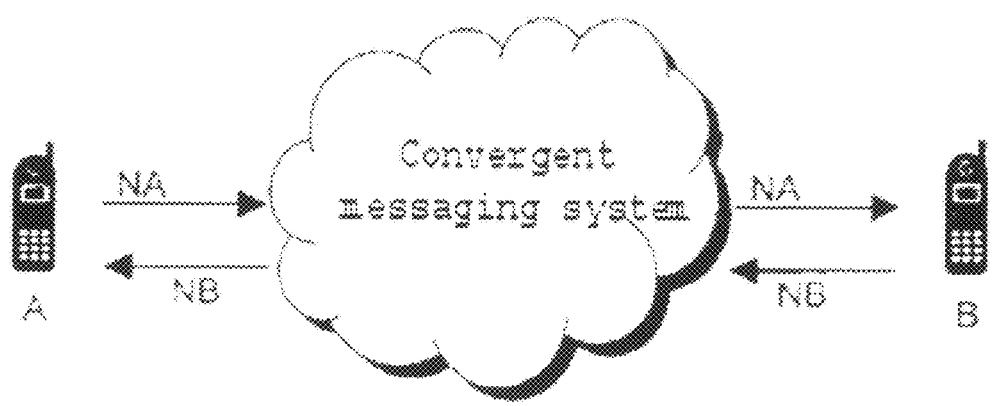

FIG. 2 schematically shows interchange of a message with a reply between two terminals using a convergent messaging system.

Figure 3:
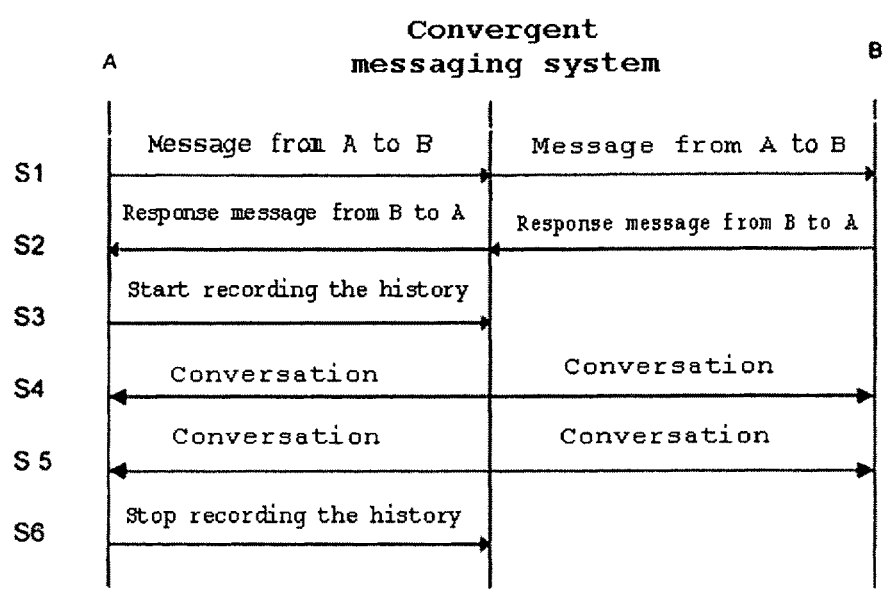

FIG. 3 shows the flow of messages between two terminals and the convergent messaging system within the context of the invention.

As described in FIG. 1, a user A uses a terminal A to send a convergent message NA to a user B on a terminal B with the aid of an associated network infrastructure of a convergent messaging system, for example. If user B does not respond to this message NA, terminal A regards this message as singular. The message NA is not stored in the network of the convergent messaging system. However, the message NA can be stored in the terminal A or in a messaging client of the terminal A in order to detect a message thread at a later time.

FIG. 2 shows the case in which the user B responds to the message NA sent by user A using the terminal A with a message NB. This response message NB is delivered to the terminal A and hence to the user A. This flow of messages is illustrated again in steps S1 and S2 in FIG. 3.

The terminal A (or the corresponding messaging client) recognizes, for example from an appropriate reference which has been assigned to the original message NA, that the message NB is a response to a message NA originally sent by terminal A. Hence, terminal A has detected that the underlying conversation is a message thread. It is now possible to initiate recording of the message thread in the network.

To start recording of the already sent messages NA, NB and of the as yet expected message interchange in the network, the invention involves a protocol message (FIG. 3, step S3) being sent from the terminal A, which detected the message thread, to the convergent messaging system. This protocol message contains both the context of the two previously interchanged messages NA, NB and a request to the convergent messaging system to record all further messages which are interchanged between the two users A and B.

As a result of this protocol message, all messages which are interchanged between the two users of the terminals A and B are stored by the convergent messaging system in a conversation history for the underlying message thread. This is illustrated in steps S4 and S5 in FIG. 3.

The two users A, B, or the messaging clients which are installed on the terminals A, B of the users, are subsequently able to request the relevant conversation history from the convergent messaging system and display it on the respective terminal. This is implemented technically by an appropriate protocol command which is sent from the terminal of the user, or the messaging client which is installed on the terminal, to the convergent messaging system. The convergent messaging system reacts to this protocol command by providing the messaging client with the desired message history.

Should the original message NA (as described above) have been sent to a plurality of addressees, the procedure described is initiated as soon as one of the adressees responds to the message NA. In this case, any conversation—regardless of from which addressees—is added to the message history. In this case, the criterion for adding a message is merely that the group of the addressees corresponds to that of the original message. All users or their messaging clients involved in the message thread are able, as described above, to request the message history from the convergent messaging system.

The recording can be ended as a result of a time limit in which no message interchange has taken place being exceeded or as a result of dedicated request from a messaging client of one of the users involved in the conversation; this is done by an appropriate protocol command which the respective user transmits to the convergent messaging system.

The invention claimed is:

1. A method for message interchange in a mobile radio system using a convergent messaging system which allows messages to be interchanged between terminals A, B of two or more users, wherein a terminal recognizes a message thread as soon as a terminal A receives from another terminal B a response message NB to a previously sent message NA, characterized in that when a message thread is recognized this terminal A initiates recording of the message interchange in the convergent messaging system, wherein the recording of the message interchange is initiated by a protocol message (S3), wherein the protocol message is sent from the terminal A, which detects the message thread, to the convergent messaging system.

2. The method as claimed in claim 1, characterized in that the time or the conditions from which/under which the message interchange is stored on the network can be selected by the user.

3. The method as claimed in claim 1, characterized in that message NA are stored in the terminal A or in a messaging client of the terminal A as a precaution in order to detect a message thread at a later time.

4. The method as claimed in claim 1, characterized in that the terminal A recognizes from an appropriate reference which has been assigned to the message NA that it is a response to a message NA originally sent by terminal A.

5. The method as claimed in claim 1, characterized in that the terminals A, B can retrieve the relevant conversation history from the convergent messaging system and display it to a user at any time.

6. The method as claimed in claim 5, characterized in that the retrieval of the conversation history is initiated by a protocol command which is sent from the terminal to the convergent messaging system.

7. The method as claimed in claim 1, characterized in that termination of the recording of message interchange is initiated when a time limit in which no message interchange has taken place is exceeded.

8. The method as claimed in claim 7, characterized in that termination of the recording of message interchange is initiated by a dedicated protocol command which is transmitted from a terminal to the convergent messaging system.

9. An apparatus for carrying out the method as claimed in claim 1, characterized by devices in the convergent messaging system which record the message interchange in the convergent messaging system when a message thread is recognized by one of the terminals involved, and when initiated by the protocol message (S3) sent by the terminal A.

10. A data processing program with a program code which, when executed on one or more data processing devices, carries out a method as claimed in claim 1.

11. A data processing program product which comprises a program code, which can be executed on one or more data processing devices, for carrying out the method as claimed in claim 1.

12. A method for message interchange in a mobile radio system using a convergent messaging system which allows messages to be interchanged between terminals A, B of two or more users, wherein a terminal recognizes a message thread as soon as a terminal A receives from another terminal B a response message NB to a previously sent message NA, characterized in that when a message thread is recognized this terminal A initiates recording of the message interchange in the convergent messaging system, wherein the recording of the message interchange is initiated by a protocol message (S3), wherein the protocol message is sent from the terminal A, which detects the message thread, to the convergent messaging system, and further characterized in that the protocol message comprises both the context of the two previously interchanged message NA and response message NB and a request to the convergent messaging system to record all further messages which are interchanged between the two terminals A and B.

13. The method as claimed in claim 12, characterized in that, when initiated by the protocol message, message NA and response message NB which are interchanged between the two terminals A and B are stored by the convergent messaging system in a conversation history for an underlying message thread.

* * * * *